(12) United States Patent
Koch et al.

(10) Patent No.: US 11,060,486 B2
(45) Date of Patent: Jul. 13, 2021

(54) INTERNAL COMBUSTION ENGINE WITH A VENTURI NOZZLE DISPOSED IN A FLUID-CARRYING COMPONENT IN FLUID CONNECTION WITH A TANK VENTILATION LINE

(71) Applicant: Volkswagen Aktiengesellschaft, Wolfsburg (DE)

(72) Inventors: Johannes Koch, Braunschweig (DE); Marko Kuenstner, Rennau (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 16/518,401

(22) Filed: Jul. 22, 2019

(65) Prior Publication Data

US 2020/0025155 A1 Jan. 23, 2020

(30) Foreign Application Priority Data

Jul. 20, 2018 (DE) ..................... 10 2018 212 149.4

(51) Int. Cl.
*F02M 25/08* (2006.01)
*B60K 15/035* (2006.01)

(52) U.S. Cl.
CPC ...... *F02M 25/089* (2013.01); *B60K 15/03519* (2013.01); *F02M 25/0872* (2013.01); *F02M 25/0836* (2013.01)

(58) Field of Classification Search
CPC ............ F02M 25/0836; F02M 25/089; F02M 25/0872; F02M 35/10222; B60K 15/03519
See application file for complete search history.

(56) References Cited

U.S. PATENT DOCUMENTS

| 5,349,935 A | 9/1994 | Mezger et al. |
| 5,918,580 A | 7/1999 | Hennrich et al. |

(Continued)

FOREIGN PATENT DOCUMENTS

| CN | 103764988 A | 4/2014 |
| CN | 106194510 A | 12/2016 |

(Continued)

OTHER PUBLICATIONS

Wo2017215824a1 specification translation.*
Chinese Office Action dated Dec. 29, 2020 in corresponding application 2019106560404.

*Primary Examiner* — Gonzalo Laguarda
(74) *Attorney, Agent, or Firm* — Muncy, Geissler, Olds & Lowe, P.C.

(57) ABSTRACT

The invention relates to an internal combustion engine having a fuel tank (36), a tank ventilation line (38) and a Venturi nozzle (30) disposed in a fluid-carrying component (16), wherein the Venturi nozzle (30) has an inflow channel (28), an opening point (40) adjoining downstream of the inflow channel (28) with a fluid connection to the tank ventilation line (38), and an outflow channel (32) adjoining downstream of the opening point (40). In this case, an outflow section (48) of the Venturi nozzle downstream of the opening point (48) is surrounded by the component (16) in such a manner that a detection space (46) is formed around the outflow section (48), wherein the detection space (46) has at least one inlet opening (50) via which the detection space (46) can be pressurized and wherein at least one pressure sensor (34) for monitoring the pressure in the detection space (46) is provided.

16 Claims, 4 Drawing Sheets

(56) References Cited

U.S. PATENT DOCUMENTS

| | | | |
|---|---|---|---|
| 6,112,728 A | | 9/2000 | Schwegler et al. |
| 6,161,423 A | | 12/2000 | Okuma |
| 9,212,633 B2 | | 12/2015 | Haag et al. |
| 9,470,186 B2 | | 10/2016 | Heller et al. |
| 9,695,765 B2 | | 7/2017 | Pflug et al. |
| 9,863,379 B2 | * | 1/2018 | Heinrich ............ F02M 25/0836 |
| 9,885,323 B1 | * | 2/2018 | Myers ................ F02M 25/0872 |
| 2003/0168402 A1 | * | 9/2003 | McKay ................ B01D 17/005 |
| | | | 210/512.1 |
| 2014/0026865 A1 | | 1/2014 | Dudar et al. |
| 2015/0240764 A1 | * | 8/2015 | Walter ............. B60K 15/03519 |
| | | | 417/76 |
| 2016/0177892 A1 | | 6/2016 | Heinrich et al. |
| 2018/0087476 A1 | | 3/2018 | Amemiya |
| 2018/0112634 A1 | | 4/2018 | Hoffman et al. |
| 2019/0162138 A1 | * | 5/2019 | Mishima ............ F02M 25/0872 |
| 2019/0309708 A1 | * | 10/2019 | Williams ............ F02D 41/0032 |
| 2019/0323461 A1 | * | 10/2019 | Koch ............... F02M 35/10118 |

FOREIGN PATENT DOCUMENTS

| | | |
|---|---|---|
| DE | 4124465 A1 | 1/1993 |
| DE | 19735549 A1 | 2/1999 |
| DE | 102010064240 A1 | 6/2012 |
| DE | 102011084539 B3 | 12/2012 |
| DE | 102016210570 A1 | 12/2017 |
| DE | 102016015299 A1 | 6/2018 |
| EP | 3557038 A2 | 10/2019 |
| WO | WO2017/215824 A1 | 12/2017 |
| WO | WO-2017215824 A1 * | 12/2017 ......... F02M 25/0836 |
| WO | WO2019195564 A1 | 10/2019 |

\* cited by examiner

INTERNAL COMBUSTION ENGINE WITH A VENTURI NOZZLE DISPOSED IN A FLUID-CARRYING COMPONENT IN FLUID CONNECTION WITH A TANK VENTILATION LINE

This nonprovisional application claims priority under 35 U.S.C. § 119(a) to German Patent Application No. 10 2018 212 149.4, which was filed in Germany on Jul. 20, 2018, and which is herein incorporated by reference

BACKGROUND OF THE INVENTION

Field of the Invention

The present invention relates to an internal combustion engine having at least one Venturi nozzle disposed in a fluid-carrying component.

Description of the Background Art

From DE 10 2011 084 539 B3, a turbocharger with a compressor is known, wherein the compressor has a low pressure input region connected to a low pressure side of a suction pipe and a high pressure output region connected to a high pressure side of the suction pipe. The turbocharger has a Venturi nozzle, which is arranged between the low pressure input region and the high pressure output region. Furthermore, the Venturi nozzle is connected to an activated charcoal filter in a tank ventilation line, so that the activated carbon filter is vented or regenerated. The Venturi nozzle may be integrated into or attached to the housing of the compressor. Details on the integration or attachment of the Venturi nozzle to the housing of the compressor are not found in this document.

From DE 41 24 465 A1, which corresponds to U.S. Pat. No. 5,349,935, a tank ventilation system and a method and an apparatus for checking the operability of such a tank ventilation system are known. The device has a pressure connection with which the tank can be pressurized, wherein the pressure in the tank can be checked via a pressure sensor. The document relates primarily to the regions of the tank, a tank connection line, and an absorption filter. A Venturi nozzle or the possibility of detecting a leakage in the area where tank gas is introduced into a suction pipe are not described in the document.

From U.S. Pat. No. 5,918,580 A, a tank ventilation system is known, which has a tank ventilation line which opens into a suction pipe and comprises an absorption filter. The document mainly concerns the transport of tank gases in the direction of the suction pipe. Details on the arrangement of a Venturi nozzle in the area of the suction pipe are not found in the document.

SUMMARY OF THE INVENTION

It is therefore an object of the present invention to provide an internal combustion engine, by means of which fuel-containing air can be reliably prevented from entering the environment.

An internal combustion engine according to an exemplary embodiment of the invention includes a fuel tank, a tank ventilation line and a Venturi nozzle disposed in a fluid-carrying component, wherein the Venturi nozzle has an inflow channel, which is in particular in fluid connection with a pressure pipe downstream of a compressor of an exhaust turbocharger. The Venturi nozzle further includes an opening point adjoining downstream of the inflow channel with a fluidic connection to the tank ventilation line and an outflow channel adjoining downstream of the opening point. The outflow channel opens in particular into an intake passage upstream of a compressor of an exhaust gas turbocharger. The flow of intake air through the Venturi nozzle along the main flow direction of the inflow channel in the direction of the outflow channel generates a negative pressure in the tank ventilation line, thereby venting the fuel tank. An outflow section of the Venturi nozzle downstream of the opening point is surrounded by the component of the intake passage in such a manner that a detection space is formed around the outflow section. In this case, the detection space has at least one input opening via which the detection space is pressurized. Furthermore, at least one pressure sensor is provided for monitoring the pressure in the detection space.

The entire outflow channel can be surrounded by the detection space formed by the component. Apart from the one inflow opening or several inflow openings, the detection space is preferably a closed space, i.e., a space which is suitably sealed off from other spaces possibly accessible via gaps, as well as from the environment possibly accessible via gaps, for example, by means of a suitable arrangement of sealing elements.

In practice, Venturi nozzles that are used for tank venting as described above are often disposed in components, which may be damaged during repair or maintenance, for example, due to the projected positioning of a component. In addition, age-related and material fatigue-related damage to such components is possible. In practice, damage in the area of the opening point at which the tank ventilation line opens into the Venturi nozzle can usually be detected at the activated charcoal canister, since the activated charcoal canister is not regenerated due to intermittent or only insufficient tank venting. This is detected by a corresponding monitoring system. In the same way, damage to the inflow channel of the Venturi nozzle upstream of the opening point can be detected because in this case, negative pressure is no longer produced in the tank ventilation line.

On the other hand, damage to the Venturi nozzle in the region downstream of the opening point is problematical, since particularly high leverage forces act here, especially in Venturi nozzles with a large length downstream of the opening point. Damage to the outflow section downstream of the opening point are not yet detectable, since the amount of the exiting intake air and in particular the associated pressure drop within the Venturi nozzle are very low and thus are usually within the measurement tolerances of corresponding detectors (in particular pressure sensors). Unnoticed damage can cause fuel-containing vapors to pass into the environment over a longer period of time.

The internal combustion engine according to the invention allows for damage in the outflow section to be reliably detected. This ensures that no fuel-containing intake air enters the environment over a long period of time. Arranging the section of the Venturi nozzle downstream of the opening point in a detection space formed by the component has two effects.

For one, if only the Venturi nozzle downstream of the opening point is damaged, the fuel-containing intake air flows into the pressurized detection space and is unable to escape from there into the environment.

Secondly, because of the surrounding arrangement of the section downstream of the opening point from the component of the intake passage, this section is particularly well-protected against damage. If in a rather unlikely event damage should occur to both the Venturi nozzle and the component surrounding the latter, then the intake air volume in present the detection space would be so great that a pressure drop caused by escaping intake air would be easily and reliably detected by the pressure sensor.

The internal combustion engine according to the invention with a surrounding arrangement of the Venturi nozzle thus counteracts damage to the Venturi nozzle in the region of a section downstream of the opening point and further allows for reliable detection in the event that the Venturi nozzle and the surrounding component are damaged.

Damage to the Venturi nozzle is particularly well counteracted if the entire outflow section, i.e., the entire outflow channel, is surrounded by the component. The component may also be designed such that at least part of the intake channel and/or at least part of a connection for the tank ventilation line are surrounded by the component. In this case, the detection space is designed such that the predominant part of the Venturi nozzle or the entire Venturi nozzle is surrounded by the component and the detection space. This effectively protects the Venturi nozzle in the appropriate sections and areas from external forces and damage.

In a practical embodiment, the fluid-carrying component is an intake hood or an exhaust gas turbocharger. Accordingly, the intake air flowing from the Venturi nozzle with the fuel-containing tank ventilation gases flows either via an intake hood, which is in fluid communication with an exhaust gas turbocharger, directly into an intake passage upstream of an exhaust gas turbocharger, or directly into an exhaust gas turbocharger. In this case, either the intake hood itself or the exhaust gas turbocharger is specifically designed such that at least one outflow section of the Venturi nozzle downstream of the opening point is surrounded in such a manner that the respective component (intake hood or exhaust gas turbocharger) at least partially forms a detection space.

In particular, the inlet opening for pressurizing the detection space is in fluid connection with a pressure pipe downstream of an exhaust gas turbocharger. The pressure pipe is connected downstream of a compressor of the exhaust gas turbocharger. Starting from the pressure pipe, compressed intake air flows in the direction of the combustion chamber. A partial flow T branches off from the pressure pipe, which opens into the inlet channel of the Venturi nozzle. This partial flow is again divided into two partial flows, wherein a partial flow $T_1$ opens into the inlet channel of the Venturi nozzle, and a partial flow $T_2$ is used to pressurize the detection space. Thus, the same pressure prevails in the Venturi nozzle as in the detection space. In particular, no further additional pressure source is necessary for pressurizing the detection space, instead, the pressure provided by the compressor is used in a simple manner.

As described in connection with what was previously described above, it is particularly advantageous if the pressure sensor is arranged in the pressure pipe downstream of the exhaust gas turbocharger. In this case, the pressure sensor, which is already present in most internal combustion engines to detect the pressure in the pressure pipe downstream of the turbocharger, can also be used to detect damage in the outflow section. Thus, additional costs for the pressure sensor are not incurred. If damage to the component in the region of the detection space were to occur, and possibly damage to the Venturi nozzle downstream of the opening point, there could be a drop in pressure in the pressure pipe of the inventive internal combustion engine from which the partial flow $T_2$ for pressurizing the detection space is branched off.

The at least one inlet opening into the detection space can be formed upstream of or in the inflow channel of the Venturi nozzle. In an embodiment of the inlet opening in the inflow channel, preferably a plurality of inlet openings are formed in the detection space, which are distributed over the circumference of the inflow channel. Thus, a radial inflow of intake air into the detection chamber may in particular be realized. The formation of inlet openings in the inflow channel is a particularly space-saving solution. The sum of the diameters of all the inlet openings is in particular at least 5 mm, preferably at least 7 mm and more preferably at least 10 mm. In comparison, the smallest diameter of the Venturi nozzle is in particular a maximum of 3 mm, preferably a maximum of 2.5 mm and in particular a maximum of 2 mm.

In particular in connection with an inlet opening upstream of the inflow channel, the at least one inlet opening into the detection chamber can be formed flow-parallel to the inflow channel of the Venturi nozzle, for example above, below or next to the inflow channel. In particular, the inflow of intake air into the detection space takes place in a direction parallel to the inflow of intake air into the inflow channel. The parallel or axial inflow is a simple way to let intake air flow from a uniform mass flow into the detection space.

In order to allow for intake air, which is flowing in a flow-parallel manner to the main flow direction, to flow into the detection space, a connection piece can be arranged in particular on the Venturi nozzle in the region of the inlet channel, of which the inner diameter is greater than the inner diameter of the inflow channel. Such a connection piece may be formed integrally with the Venturi nozzle or produced as a separate element and arranged accordingly. Preferably, upstream of the inflow channel, first the entire stream T flows into the connection piece, which in the connection piece is divided into two partial streams $T_1$ and $T_2$ flowing into the inflow channel and into the at least one inflow opening, in particular a radial inner partial stream $T_1$ and a partial stream $T_2$ radially surrounding and enclosing the former.

The Venturi nozzle can be designed in several parts. In particular, the inflow channel, the outflow channel and a connection for the tank ventilation line may be formed as separate elements, which are connected to one another only during assembly of the internal combustion engine, for example by plugging together and/or welding. In particular, the Venturi nozzle comprises a base body, which is formed integrally with the inflow channel and in which the separate inflow channel and a connection for the tank ventilation line are provided. Alternatively, the Venturi nozzle may be formed integrally.

The Venturi nozzle can also have two or more opening points, which are fluidly connected to the tank ventilation line to achieve particularly effective tank ventilation. The Venturi nozzle is narrowed in each case in the region of the opening. If a plurality of opening locations is provided, in particular a section of the Venturi nozzle is surrounded by the component and the detection space, which extends downstream of the first opening point when viewed in the main flow direction.

The invention has been made especially in connection with fluid-carrying components and/or Venturi nozzles in fluid-carrying components, i.e., which are completely or partially made of plastic. For it is precisely plastic components that can become brittle after a longer service life due to the nature of their material, and then suddenly fail. Such failure can be detected reliably with the internal combustion engine according to the invention.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
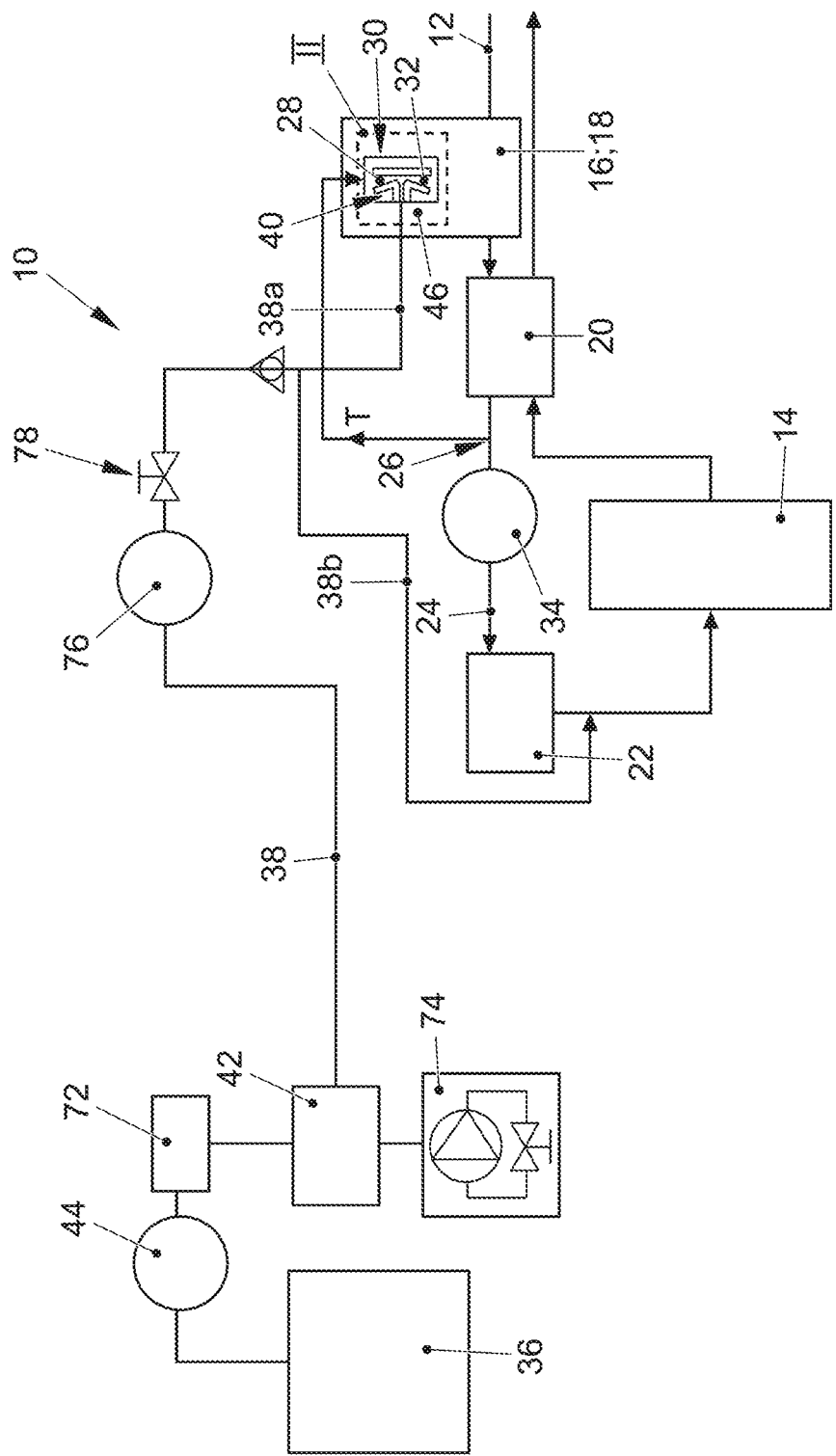
FIG. 1 is a schematic representation of an internal combustion engine according to the invention.

FIG. 1 shows a schematic illustration of an internal combustion engine 10 according to the invention, wherein only those elements which are potentially relevant to the invention will be explained in detail in the following.

In the internal combustion engine 10, an intake passage 12 is formed via which fresh air from the atmosphere can be fed in the direction of a combustion chamber 14. An intake hood 18 is provided as a fluid-carrying component 16 of the intake passage 12. Downstream of the intake hood 18 are a compressor of an exhaust gas turbocharger 20 and a throttle valve 22.

The area downstream of the compressor is referred to as a pressure pipe 24. At a junction 26 downstream of the exhaust gas turbocharger 20, a partial flow T branches off from the pressure pipe 24, wherein the partial flow T is guided into an inflow channel 28 of a Venturi nozzle 30. An outflow channel 32 of the Venturi nozzle 30 leads back into the intake hood 18.

Via the outflow channel 32 and the intake hood 18, intake air from the Venturi nozzle 30 is guided into the intake passage 12 upstream of the exhaust gas turbocharger 20.

As can be seen in FIG. 1, a pressure sensor 34 is arranged in the pressure pipe 24, in this case downstream of the junction 26 of the partial flow T.

Exhaust guided from the combustion chamber 14 flows through the exhaust gas turbocharger 20 in the direction of an exhaust system.

The internal combustion engine 10 also includes or is connectable to a fuel tank 36 which is vented via a tank ventilation line 38. A first branch 38a of the tank ventilation line 38 leads to an opening point 40 into the Venturi nozzle 30. A second branch 38b of the tank ventilation line 38 leads into the area downstream of the throttle valve 22.

Further, a first pressure and temperature sensor 44, a fuel tank isolation valve (FTIV) 72, an active charcoal canister 42, a diagnostic module tank leakage (DMTL) 74, a pressure/temperature sensor 76 and a tank ventilation valve (TEV) 78 are arranged in the path of the tank ventilation line 38.

As also already illustrated schematically in FIG. 1 and as explained below in more detail with reference to the other figures, the Venturi nozzle 30 is at least partially surrounded by a detection space 46, shown in FIG. 1 only as a dashed box.

Figure 2:
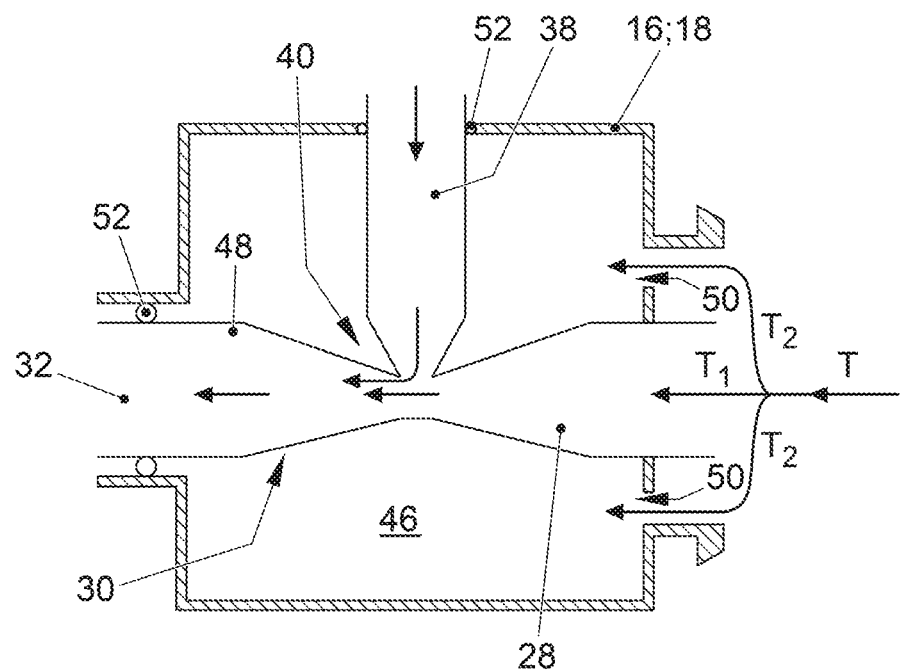
FIG. 2 shows the region in FIG. 1 labeled with II with a Venturi nozzle and a detection space in a schematic cross section.

FIG. 2 shows the Venturi nozzle 30 and the fluid-carrying component 16 in this case as part of the intake hood 18 in a simplified sectional view. On the right side, the Venturi nozzle 30 has the inflow channel 28 and on the left side, the outflow channel 32. At the opening point 40, the tank ventilation line 38 opens from above.

The partial flow T, which branches off from the pressure pipe 24 (see FIG. 1), flows partially into the inflow channel 28 and further in the main flow direction through the Venturi nozzle 30 towards the outflow opening of the outflow channel 32. Due to the geometric design, negative pressure is generated in the tank ventilation line 38 in the region of the opening point 40 so that fuel-containing gases are actively promoted from the fuel tank 36 or from the active charcoal canister 42, said gases discharging into the intake passage 12 via the outflow channel 32 upstream of the exhaust gas turbocharger 20 (see FIG. 1).

In the illustration according to FIG. 2, as a section downstream of the opening point 40, almost the entire outflow channel 32, almost the entire inflow channel 28 and a portion of the tank ventilation line 38 up to the opening point 40 are surrounded by a housing portion of the intake hood 18 in such a manner that a detection space 46 surrounding these areas is formed.

Here, the detection space 46 has two inflow openings 50 (or alternatively, an annular inflow opening or a plurality of inflow openings) via which the detection space 46 is filled with intake air and therefore pressurized with a certain degree of pressure. The detection space 46 is sealed off from the tank ventilation line 38 and from the outflow channel 43 by means of O-rings 52. Alternatively, sealing from the inlet channel 28 can be achieved in the same manner, if such a seal is structurally necessary and/or appropriate.

As can be clearly seen in FIG. 2, the partial flow T which branches off from the pressure pipe 24 is divided due to the structural design in that a partial flow $T_1$ is fed into the Venturi nozzle 30 and a partial flow $T_2$ is fed via the inflow openings 50 into the detection space 46. Thus, the same pressure presents itself in the Venturi nozzle 30 as in the detection space 46.

Figure 3:
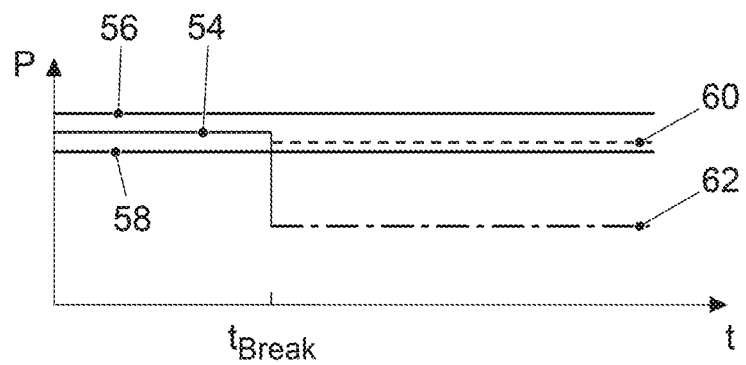
FIG. 3 is a pressure-time-chart

In conjunction with the diagram in FIG. 3, the operating principle of the internal combustion engine 10 according to the invention is explained below. By means of the pressure sensor 34 located in the pressure pipe 24 (or alternatively, a pressure sensor located in another suitable place), the pressure in the pressure pipe 24 is monitored downstream of the junction 26 of the partial flow T. The solid line 54 in FIG. 3 represents the pressure which prevails in the pressure pipe during normal operation or during a specific, constant operating state. The two solid lines 56, 58 arranged above and below represent the measurement tolerance within which the pressure in the pressure pipe 24 can fluctuate without the pressure sensor 34 detecting an equivalent change in pressure.

In the arrangement of a Venturi nozzle 30 in accordance with the prior art, in the event of damage to the Venturi nozzle 30 downstream of the opening point 40, only a small pressure drop in the pressure pipe 24 would occur (see dashed line 60 in FIG. 3), which is in the range of the measurement tolerance and could therefore not be detected by the pressure sensor 34. In contrast, if the Venturi nozzle 30 in an inventive internal combustion engine 10 were to be damaged, the fuel-containing intake air would only pass into the detection space 46 and not into the environment.

If the section downstream of the opening point 40 and additionally the fluid-carrying component 16 is damaged in the region of the detection space 46, there is a significant pressure drop according to the dotted line 62 in FIG. 3. This pressure drop is outside the measurement tolerance of the pressure sensor 34 so that it can be detected by an evaluation unit assigned to this pressure sensor 34. Thus, it can be prevented that fuel-containing intake air, which flows downstream of the opening point 40 from the damaged Venturi nozzle 30, enters the environment unnoticed.

Figure 4:
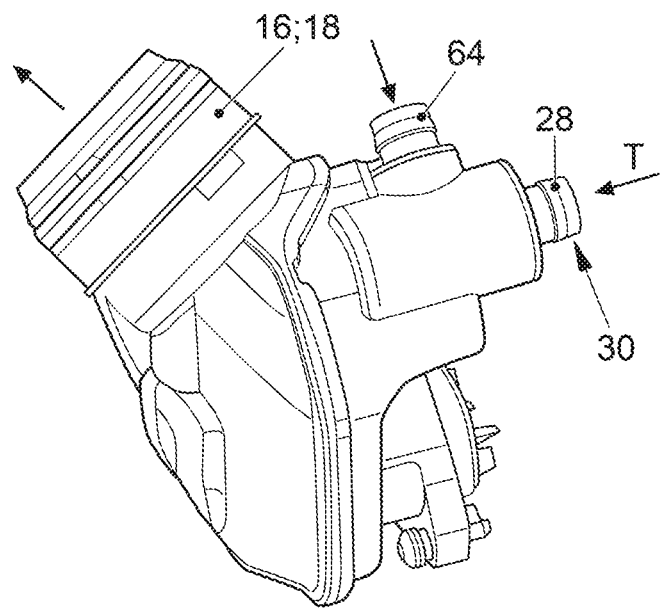
FIG. 4 shows an embodiment of an internal combustion engine according to the invention with a Venturi nozzle in a perspective view.
Figure 5:
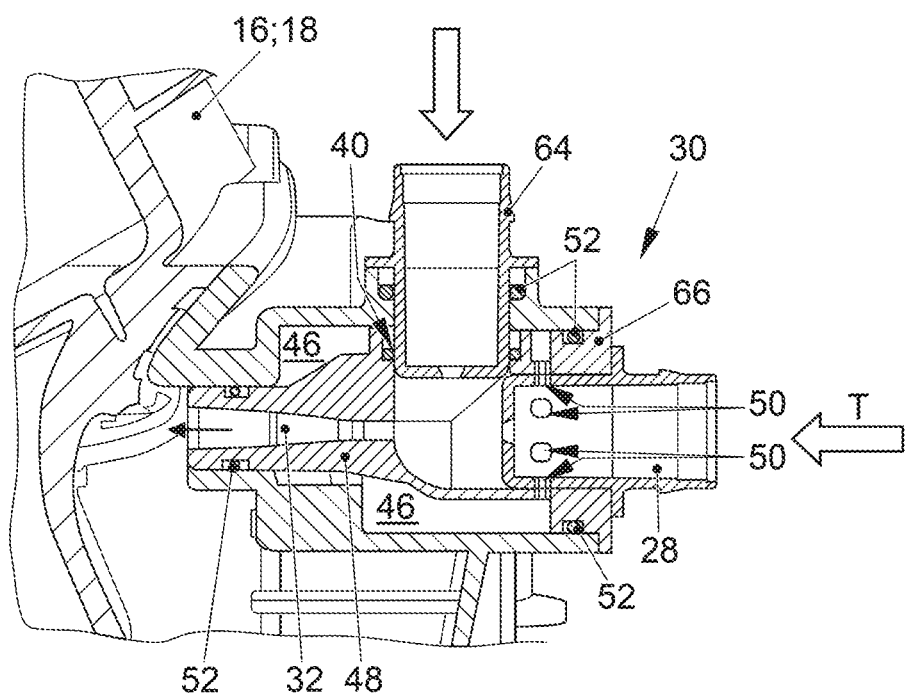
FIG. 5 shows the first embodiment from FIG. 4 in a cross section through the Venturi nozzle.

FIGS. 4 and 5 show a first embodiment of an internal combustion engine with an intake hood 18 as a fluid-carrying component 16, in which a Venturi nozzle 30 is also integrated.

As can be clearly seen in the sectional view of FIG. 5, in this embodiment the Venturi nozzle 30 is formed in several parts. It comprises an inflow passage 28 designed as a separate element, a port 64 designed as a separate element for the tank ventilation line 38, and a separately formed base body 66 including the outflow channel 32. The Venturi nozzle 30 is surrounded by a housing portion of the intake hood 18 in such a manner that the detection space 46 is formed around a section of the outflow channel 32, around a section of the port 64 for the tank ventilation line 38 and around a section of the inflow channel 28. In the region of the channels 28, 32 and the port 64, said detection space 46 is sealed from the environment by means of O-rings 52.

In this first embodiment, the inflow openings 50 of the detection space 46 are formed in the inflow channel 28. For partial flow $T_1$, to this end inflow openings 50 extending in the radial direction and present in the inflow channel are provided. In the embodiment shown, the inflow openings 50 are designed such that the total flow cross section of approximately one through opening corresponds to a diameter of 10 mm.

Figure 6:
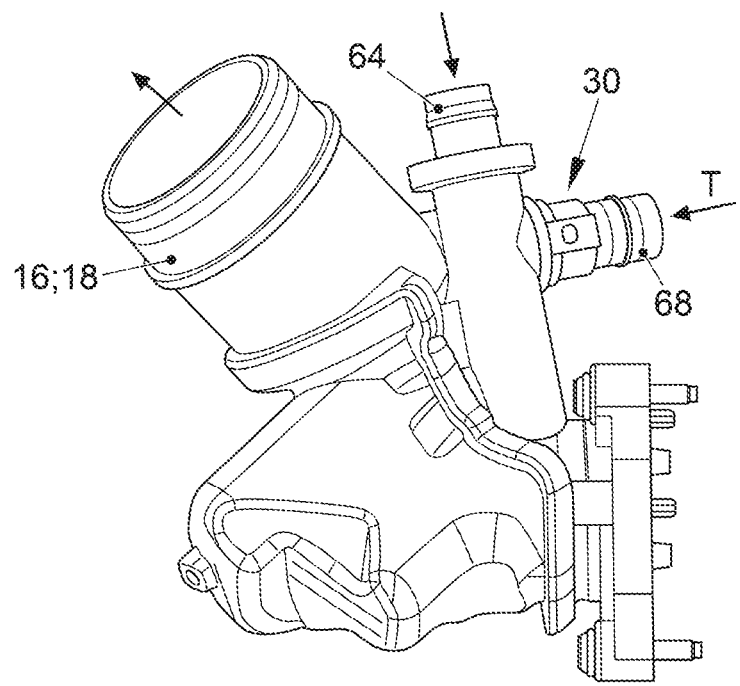
FIG. 6 shows an embodiment of an internal combustion engine according to the invention with a Venturi nozzle in a perspective view.
Figure 7:
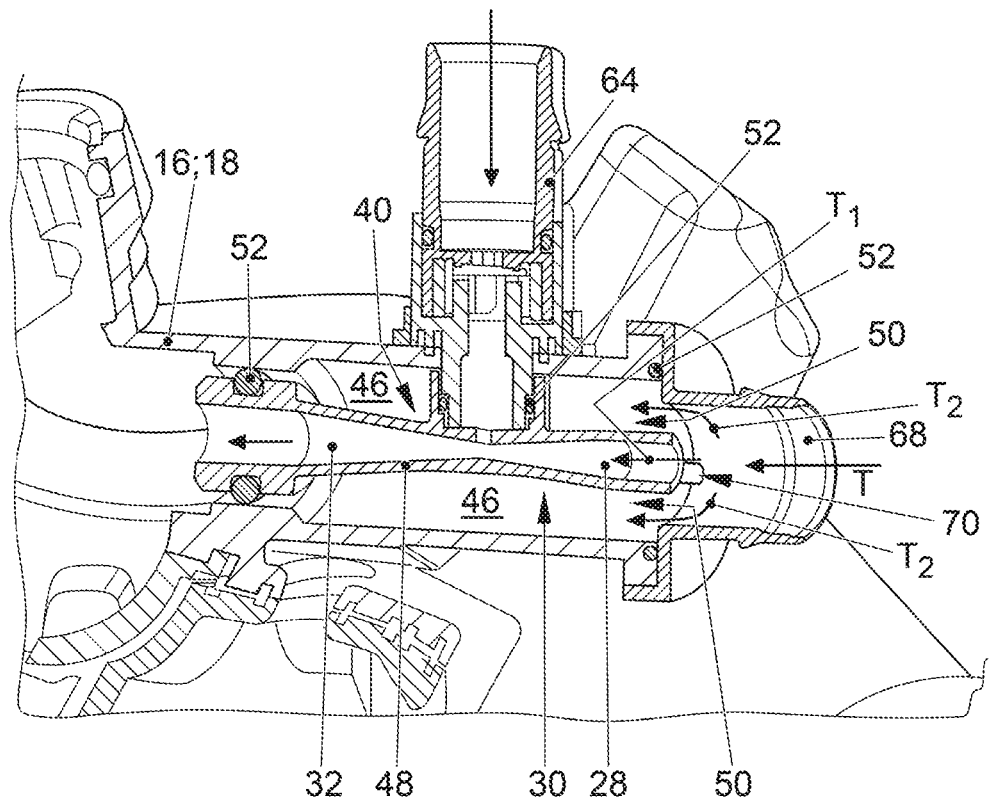
FIG. 7 shows the second embodiment in a cross section through the Venturi nozzle.

FIGS. 6 and 7 show a second embodiment of an internal combustion engine having an intake hood 18 as a fluid-carrying component 16 and a Venturi nozzle 30 disposed thereon. In the following, only the differences from the first embodiment will be discussed. In this second embodiment, the Venturi nozzle 30 is formed in one piece and comprises a connection piece 68. The connection piece 68 is formed on the inlet channel 28 and is connected to the inlet channel 28 by means of a connecting web 70 or by means of a plurality of connecting webs 70 (in the sectional view in FIG. 7, only one connecting web 70 can be seen).

First, the entire partial flow T flows into the connection piece 68. At the beginning of the inlet channel 28, which has a significantly smaller diameter than the connection piece 68, a first partial flow $T_1$ is then directed into the inlet channel 28 and a second partial flow $T_2$ is fed axially parallel thereto, radially outwardly via inflow openings 50, directly into the detection space 46. In this embodiment, the flow losses are lower due to the deflection that is not necessary in the radial direction and the resulting direct introduction of the partial flow $T_2$ into the detection space.

The features of the invention disclosed in the present description, in the drawings and in the claims may be essential individually as well as in any combination to be able to realize the invention in its various embodiments. The invention may be varied within the scope of the claims and by taking into consideration the knowledge of those skilled in the art.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An internal combustion engine comprising:
   a tank ventilation line;
   a Venturi nozzle disposed in a fluid-carrying component, the Venturi nozzle comprising a first inflow channel, a second inflow channel that is connected to the tank ventilation line, an opening point adjoining downstream of both the first inflow channel and the second inflow channel, and an outflow channel adjoining downstream of the opening point; and
   an outflow section of the Venturi nozzle, that is downstream of the opening point and leads into an intake hood, is surrounded by the fluid-carrying component such that a detection space is formed around an exterior of the outflow section,
   wherein the detection space has at least one inlet opening via which the detection space is pressurized,
   wherein, for pressurizing the detection space, the at least one inlet opening is in fluid connection with a pressure pipe that is downstream of an exhaust gas turbocharger, such that fluid from the pressure pipe that is downstream of the exhaust gas turbocharger flows into the detection space via the at least one inlet opening of the detection space to pressurize the detection space,
   wherein at least one pressure sensor monitors a pressure in the detection space, and
   wherein the detection space is sealed off from the outflow section of the outflow channel, such that fluid flowing out of the outflow section flows into the intake hood without entering into the detection space.

2. The internal combustion engine according to claim 1, wherein the first inflow channel and/or a port to the tank ventilation line are at least partially surrounded by the fluid-carrying component, wherein the port forms the second inflow channel.

3. The internal combustion engine according to claim 1, wherein the at least one pressure sensor is arranged in the pressure pipe downstream of the exhaust gas turbocharger.

4. The internal combustion engine according to claim 1, wherein the at least one inlet opening into the detection space is formed upstream of or in the first inflow channel of the Venturi nozzle.

5. The internal combustion engine according to claim 1, wherein the at least one inlet opening into the detection space is formed flow-parallel to the first inflow channel of the Venturi nozzle.

6. The internal combustion engine according to claim 1, wherein a connection piece is provided upstream of the first inflow channel of the Venturi nozzle.

7. The internal combustion engine according to claim 1, wherein the Venturi nozzle is formed in several parts.

8. The internal combustion engine according to claim 1, wherein the Venturi nozzle and/or the fluid-carrying component is completely or partially made of plastic.

9. The internal combustion engine according to claim 1, wherein the internal combustion engine is connectable to a fuel tank.

10. The internal combustion engine according to claim 1, wherein the tank ventilation line terminates directly at the opening point of the Venturi nozzle, such that an end section of the tank ventilation line forms the second inflow channel.

11. The internal combustion engine according to claim 10, wherein the detection space is sealed off from the tank ventilation line and wherein the outflow channel is contained within the outflow section.

12. The internal combustion engine according to claim 1, wherein the opening point is an inlet into the Venturi nozzle.

13. The internal combustion engine according to claim 1, wherein the Venturi nozzle is surrounded by the detection space, such that at least a portion of the outflow channel, the tank ventilation line, the opening point and the first inflow channel are disposed in the detection space.

14. The internal combustion engine according to claim 1, wherein the at least one inlet opening is a through-hole formed in a side wall of the first inflow channel at a position that is downstream of an inflow opening of the first inflow channel and upstream of the opening point, such that after a fluid flows axially into the first inflow channel via the inflow opening of the first inflow channel, a portion of the fluid flows radially out of the first inflow channel and into the detection space via the through-hole while a remainder of the fluid continues to flow axially through the first inflow channel.

15. The internal combustion engine according to claim 1, further comprising a connection piece, the connection piece coaxially surrounding an upstream end portion of the first inflow channel, wherein the at least one inlet opening is provided by a space between an inner surface of the connection piece and an external surface of the upstream end portion of the first inflow channel.

16. The internal combustion engine according to claim 1, wherein an entirety of the outflow section is inserted inside the intake hood.

* * * * *